(12) United States Patent
McGinley et al.

(10) Patent No.: US 8,769,697 B2
(45) Date of Patent: Jul. 1, 2014

(54) METHODS AND SYSTEMS FOR AUTOMATED NETWORK SCANNING IN DYNAMIC VIRTUALIZED ENVIRONMENTS

(75) Inventors: Kevin McGinley, San Francisco, CA (US); Rich Tener, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 143 days.

(21) Appl. No.: 13/438,688

(22) Filed: Apr. 3, 2012

(65) Prior Publication Data

US 2013/0091577 A1    Apr. 11, 2013

Related U.S. Application Data

(60) Provisional application No. 61/543,795, filed on Oct. 5, 2011.

(51) Int. Cl.
| | |
|---|---|
| *G06F 11/00* | (2006.01) |
| *G06F 21/00* | (2013.01) |
| *G06F 21/57* | (2013.01) |
| *H04L 29/06* | (2006.01) |
| *G06F 21/53* | (2013.01) |

(52) U.S. Cl.
CPC .............. *G06F 21/00* (2013.01); *G06F 21/577* (2013.01); *H04L 63/1433* (2013.01); *G06F 21/53* (2013.01)
USPC .................... 726/25; 726/22; 726/23; 726/24

(58) Field of Classification Search
CPC ...... H04L 12/2697; H04L 41/22; H04L 43/50; H04L 63/1408; H04L 63/1433
USPC ....................................... 726/22–25
See application file for complete search history.

(56) References Cited

U.S. PATENT DOCUMENTS

| | | | |
|---|---|---|---|
| 7,664,845 B2 | 2/2010 | Kurtz et al. | |
| 8,286,002 B2 * | 10/2012 | Kamat et al. ................. | 713/192 |
| 8,505,006 B1 * | 8/2013 | Larkin et al. ...................... | 718/1 |
| 2011/0145886 A1 | 6/2011 | McKenzie et al. | |

FOREIGN PATENT DOCUMENTS

WO    WO 2004100011 A1 *  11/2004

* cited by examiner

*Primary Examiner* — Thanhnga B Truong
(74) *Attorney, Agent, or Firm* — Martine Penilla Group, LLP

(57) ABSTRACT

Systems and methods for managing jobs to be scanned based on existence of processing nodes are described. One of the methods includes obtaining identification information regarding operation of a first set of the processing nodes from an inventory and creating a job for scanning the processing nodes of the first set for security vulnerability. The job includes the identification information. The method further includes verifying the inventory to determine the first identifying information of the first set of processing nodes for removal from the job and loading the job having second identifying information for a second set of processing nodes that remain after the verifying operation.

20 Claims, 8 Drawing Sheets

METHODS AND SYSTEMS FOR AUTOMATED NETWORK SCANNING IN DYNAMIC VIRTUALIZED ENVIRONMENTS

CROSS-REFERENCE TO RELATED APPLICATIONS

This patent application claims priority to and benefit of, under 35 U.S.C. §119(e), to provisional patent application having Application No. 61/543,795, filed on Oct. 5, 2011, and titled "Methods and Systems for Automated Network Scanning In Dynamic Virtualized Environments", which is incorporated by reference herein in its entirety for all purposes.

FIELD OF THE INVENTION

The present invention relates to methods and systems for automated network scanning in dynamic virtualized environments.

BACKGROUND

A 'cloud' is a common word used to define computing systems and storage that have been networked to provide computing and storage resources to devices connected to the Internet. The reliability and security of a cloud is usually performed in a world where computer networks are a key element in intra-entity and inter-entity communications and transactions. Various tools have been used by network administrators, government, security consultants, and hackers to test the vulnerabilities of the cloud, such as, for example, whether any virtual machines (VMs) in the cloud can be accessed and controlled remotely without authorization. Through this intensive testing, the cloud can be "hardened" against common vulnerabilities and esoteric attacks.

A tool such as a vulnerability scanner can be used to test an individual VM in the cloud to determine which VMs are "open", these "open" VMs may provide access for possible intrusion, and potentially represent a vulnerability that can be exploited by a malicious hacker. However, because of the vast number of hosts in a provider's multi-tenancy cloud, scanning takes a long time.

It is within this context that embodiments of the present invention arise.

SUMMARY

Embodiments of the present invention provide methods and systems for automated network scanning in dynamic virtualized environments In one embodiment, a host information processing system (HIPRS) minimizes operational overhead when scanning rapidly-changing sets of hosts (also sometimes referred to as nodes) by automatically retrieving inventory records via an application programming interface (API), and synchronizing a job with the inventory records before each block within the job is dispatched for scanning. A job is a scan job performed by a vulnerability scanner. In some embodiments, HIPRS minimizes unintentional scanning of foreign hosts. In one embodiment, the foreign hosts are not owned or operated by an owner of the vulnerability scanner.

In various embodiments, HIPRS increases accuracy of scan data by preventing unintentionally scanned foreign hosts from being reported in result sets. In one embodiment, HIPRS load-balances blocks across multiple vulnerability scanners to increase overall performance and allow for horizontal scaling.

HIPRS uses cloud environments, with nearly all hosts indexed in a continuously-updated inventory database. Using this inventory database, HIPRS is able to construct a job that includes information, such as Internet Protocol (IP) addresses or nicknames, of a set of hosts and further includes associated state tracking information used to manage the job.

When the job is initialized, a snapshot of the current inventory including information about N hosts is taken and stored in a job bundle. The snapshot is then logically partitioned into X blocks of host information.

Before the job bundle is uploaded to a vulnerability scanner, HIPRS synchronizes a job host database with the current cloud inventory and removes information regarding terminated hosts from the blocks. The job host database is a part of a storage system that includes information regarding a job. In one embodiment, the synchronization is performed to subtract information regarding terminated hosts from blocks.

In one embodiment, the job initialization process also creates metadata entries for tracking the job, such as a job name and a runtime error log. Each block has a state value associated with it, which is used for tracking the state of the block and the overall progress of the job. If there are pending blocks to be scanned, HIPRS selects the next block available and queries a vulnerability scanner to determine a state of previously dispatched blocks and to determine whether there are scanning resources available to scan a new block. If the vulnerability scanner indicates that a previously dispatched scan task is finished, its associated work unit is marked complete in the job host database and no further processing is performed on the work unit. If scanning resources are available, HIPRS dispatches the next pending block for scanning and then records metadata to associate a task identification (ID) returned by the vulnerability scanner with the block for tracking.

In some embodiments, if an error is encountered when communicating with the vulnerability scanner or if the vulnerability scanner indicates that an exception occurred during a scan, the block is marked with an error flag and may be marked for rescan manually by a user.

In one embodiment, when all blocks within a job are marked complete or as having an error, the job is considered completed.

In some embodiments, after the job completes, HIPRS provides a mechanism to retrieve an export of vulnerability scan data for additional post-processing. In various embodiments, the vulnerability scan data can be obtained in other forms and methods, such as by accessing a file, a database, a graphical user interface (GUI) that provides graphical results, tabulated data, lists, metrics, etc. In some embodiments, the vulnerability scan data can also be sent to interested administrators for review by email, notifications, text messages, links, etc. In one embodiment, hosts marked as terminated are not included in the job database to enhance reporting accuracy.

In one aspect, a method for managing jobs to be scanned based on existence of processing nodes is provided. The method includes obtaining identification information regarding operation of a first set of the processing nodes from an inventory and creating a job for scanning the processing nodes of the first set for security vulnerability. The job includes the identification information. The method further includes verifying the inventory to determine the first identifying information of the first set of processing nodes for removal from the job and loading the job having second identifying information for a second set of processing nodes that remain after the verifying operation.

In another aspect, the method includes receiving scanning results from the loaded job. The scanning results are processed to remove results associated with processing nodes that were removed during the scanning.

In yet another aspect, a method for managing jobs to be scanned based on existence of processing nodes is described. The method includes loading a job having identifying information for a first set of the processing nodes, receiving scanning results from the loaded job, and removing results associated with a second set of processing nodes that were removed during the scanning.

In another aspect, a system for managing jobs to be scanned based on existence of processing nodes is described. The system includes a memory device configured to store a job creator module and a job loader module. The system further includes a processor configured to execute the job creator module to obtain identification information regarding operation of a first set of the processing nodes from an inventory. The job loader module is executed to create a job for scanning the processing nodes of the first set for security vulnerability. The job includes the identification information. Moreover, the processor is configured to execute the job loader module to verify the inventory to determine first identifying information of a first one of the processing nodes of the first set for removal from the job. The job loader module is executed to load the job having second identifying information for a second set of processing nodes that remain after the verification.

In yet another aspect, a method for managing jobs to be scanned based on existence of processing nodes is described. The method includes obtaining identification information regarding operation of the processing nodes, creating a job having the identification information, determining identifying information of at least one of the processing nodes for removal from the job, and removing the at least one processing node based on the determined identifying information. The identification information is updated after the removing operation. The method further includes loading the job having the updated identification information for processing nodes that remain after the removing operation. The loading is performed for scanning the remaining processing nodes for vulnerability to security attacks.

Other aspects of the invention will become apparent from the following detailed description, taken in conjunction with the accompanying drawings, illustrating by way of example the principles of various embodiments of the present invention.

BRIEF DESCRIPTION OF THE DRAWINGS

Various embodiments of the present invention may best be understood by reference to the following description taken in conjunction with the accompanying drawings in which.

DETAILED DESCRIPTION

It should be noted that various embodiments of the present invention may be practiced without some or all of these specific details. In other instances, well known process operations have not been described in detail in order not to unnecessarily obscure various embodiments of the present invention.

A host information processing system (HIPRS) and its functionality are described herein. A host is commonly referred to as a 'node', which has processing power and assigned an Internet Protocol (IP) address, or other identifier. A host may be a virtual machine (VM) or a physical machine, or a combination of the VM and the physical machine. Although specific mention may be made to virtual machines in various sections of the patent application, various embodiments can also work on physical machines.

In one embodiment, HIPRS includes a computer, which further includes a controller and may include a display device. In various embodiments, the controller may execute an interactive program to render a report on the display. A display device, as used herein, may be a monitor, which is capable of receiving and rendering video output from the controller. A monitor may be a cathode ray tube (CRT) monitor, a liquid crystal display (LCD) monitor, or a light emitting diode (LED) monitor.

In some embodiments, HIPRS communicates with a cloud to determine whether a host has been terminated. The determination is used to avoid a vulnerability scan of the host and/or to avoid generating a report that includes data from a vulnerability scan of the host.

HIPRS communicates with one or more vulnerability scanner nodes to dispatch 'pending' blocks, which are described below, to perform a vulnerability scan. A vulnerability scan is used to determine whether a host possesses a vulnerability that can be exploited by a malicious hacker.

Figure 1:
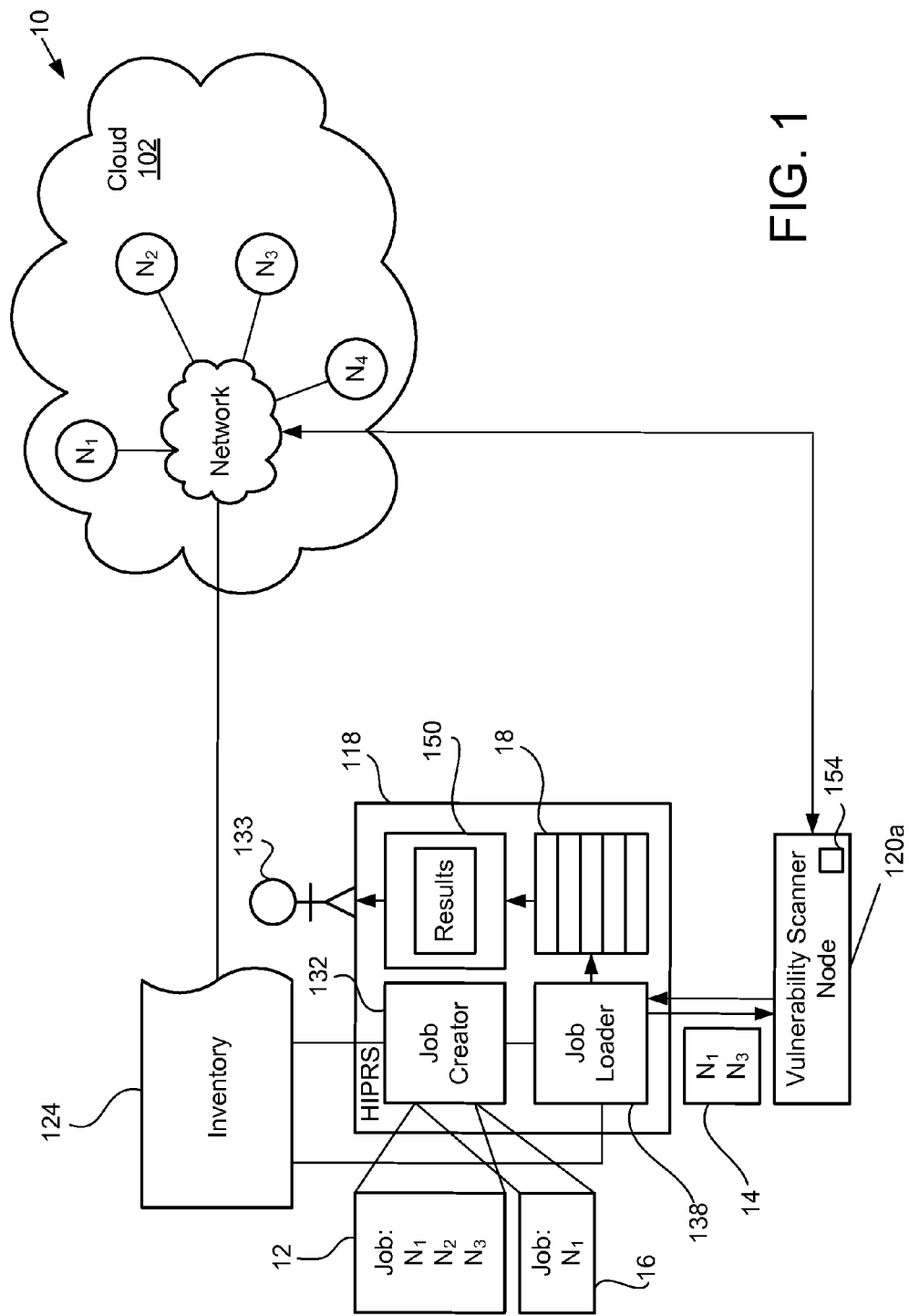
FIG. 1 illustrates a vulnerability scan architecture, in accordance with one embodiment of the present invention.

FIG. 1 illustrates an embodiment of a vulnerability scan architecture 10. The vulnerability scan architecture 10 allows for automated network scanning in a dynamic network environment. In one embodiment, processing nodes N1, N2, and N3 of a cloud 102 are scanned by a vulnerability scanner 120a automatically. The scanning may be periodic or random. Each processing node N1-N4 may be a VM or a physical machine. A physical machine may be a computer, a server, or a processor. Each processing node N1-N4 is associated with identifying information, such as an IP address, a media access control address (MAC address), or another other address that identifies the node.

Any processing node N1-N4 may terminate at any time for a variety of reasons. In one embodiment, processing node N1 terminates when it malfunctions or lacks operation. In some embodiments, processing node N2 terminates when an application executing within the node changes. In other embodiments, the node N3 terminates when an owner of the processing node N3 releases ownership to another entity. For example, the processing node N3 terminates when a company X takes control of the processing node N3 to execute an application. In this example, the processing node N3 was controlled by another company Y to execute an application before the termination. In one embodiment, an entity that executes an application on a node controls the node. In some embodiments, an entity that executes an operating system on a node controls the node. The termination of any processing node N1-N4 from cloud 102 at any time provides a dynamic changing environment. The cloud 102 changes dynamically with termination of processing node.

An inventory 124 stores identifying information regarding operation of the nodes N1, N2, and N3, which are controlled by an entity. Inventory 124 is specific to an entity in that the inventory 124 includes identifying information regarding processing nodes controlled by the entity. In one embodiment, inventory 124 avoids storing identifying information regarding node N4 that is controlled by an entity different from one controlling the nodes N1, N2, and N3. In one embodiment, identifying information regarding a node includes an IP address of the node, a MAC address of the node, a nickname of the node, a name of an application executing within the node, a name of an operating system executing within the node, or a combination thereof.

A job creator module 132 within HIPRS 118 accesses the identifying information regarding the nodes N1, N2, and N3 from inventory 124 to create a job 12. The job 12 has identifying information regarding the nodes N1, N2, and N3. The job 12 is created to provide to vulnerability scanner node 120 to determine whether any node N1, N2, or N3 is vulnerable to security attacks by hackers. In one embodiment, the node N1 is vulnerable to security attack when the node N1 does not have the latest software security updates installed. In another embodiment, the node N2 is vulnerable to security attack when the node is unprotected by a firewall. In one embodiment, a security attack includes installing or running unauthorized code or programs, such as viruses and malware, on node N1, N2, or N3. The unauthorized code or programs lack authorization from an owner of the node N1, N2, or N3.

Before uploading job 12 to vulnerability scanner node 120a, a job loader module 138 accesses the inventory 124 to determine identifying information of any one of the plurality of processing nodes N1, N2, and N3 for removal from the job 12. In one embodiment, job loader module 138 compares identifying information stored in inventory 124 with identifying information in job 12 to determine whether processing node N1, N2, or N3 is terminated. When processing node N1, N2, or N3 is terminated, information identifying the node is deleted from inventory 124. In one embodiment, processing node N2 is terminated between a time of creation of job 12 and a time of the verification by job loader module 138.

When job loader module 138 determines that identifying information regarding processing node N1, N2, or N3 is missing from inventory 124, the job loader module 138 determines to purge identifying information regarding the node from job 12 to create a job 14. After the purge, the job loader module 138 submits job 14 to vulnerability scanner node 120a. In one embodiment, the new job 14 includes identifying information regarding processing nodes N1 and N3, and excludes identifying information regarding the processing node N2.

Upon receiving job 14, the vulnerability scanner node 120a executes a vulnerability scan on the processing nodes, such as N1 and N3, identified in the job 14. The vulnerability scanner node 120a generates scanning results. In one embodiment, the vulnerability scanner node 120a generates scanning results indicating that node N1 is a high risk node and N3 is a low risk node. In another embodiment, vulnerability scanner 120 generates scanning results indicating that node N1 has a risk score of 7 out of 10 and node N3 has a risk score of 4 out of 10.

In one embodiment, the scanning results are provided by the vulnerability scanner node 120a to job loader module 138. During the scan, processing node N1 or N3 or both may have been terminated. If so, inventory 124 is updated to remove identifying information regarding the terminated processing node, such as N3. When inventory is updated, job creator 132 updates the job 14 to purge identifying information regarding the terminated node to create a job 16. Job loader module 138 access the job 16 to determine that processing node, such as N3, was terminated. Job loader module 138 removes, such as deletes, from the scanning results, results of scanning the terminated processing node, such as node N3, to generate scanning results 18. In some embodiments, the job loader module 138 deletes a risk score or a risk level provided to the node N3 from scanning results received from vulnerability scanner node 120a to generate the scanning results 18. In one embodiment, the scanning results 18 are displayed on a display device 150 to show to a user 133.

In another embodiment, the job loader module 138 may avoid requesting scanning results for job 14 from vulnerability scanner node 120a. Rather, the job loader module 138 accesses vulnerability scanning results to delete a portion of the scanning results to further generate the scanning results 18. The portion corresponds to the terminated processing node that was terminated during execution of the job 14 by vulnerability scanning node 120a. The scanning results 18 are displayed on display device 150 or on a display device 154 of vulnerability scanner node 120a.

It should be noted that although four nodes are shown in cloud 102, in one embodiment, a different number of nodes may be included within cloud 102.

Figure 2:
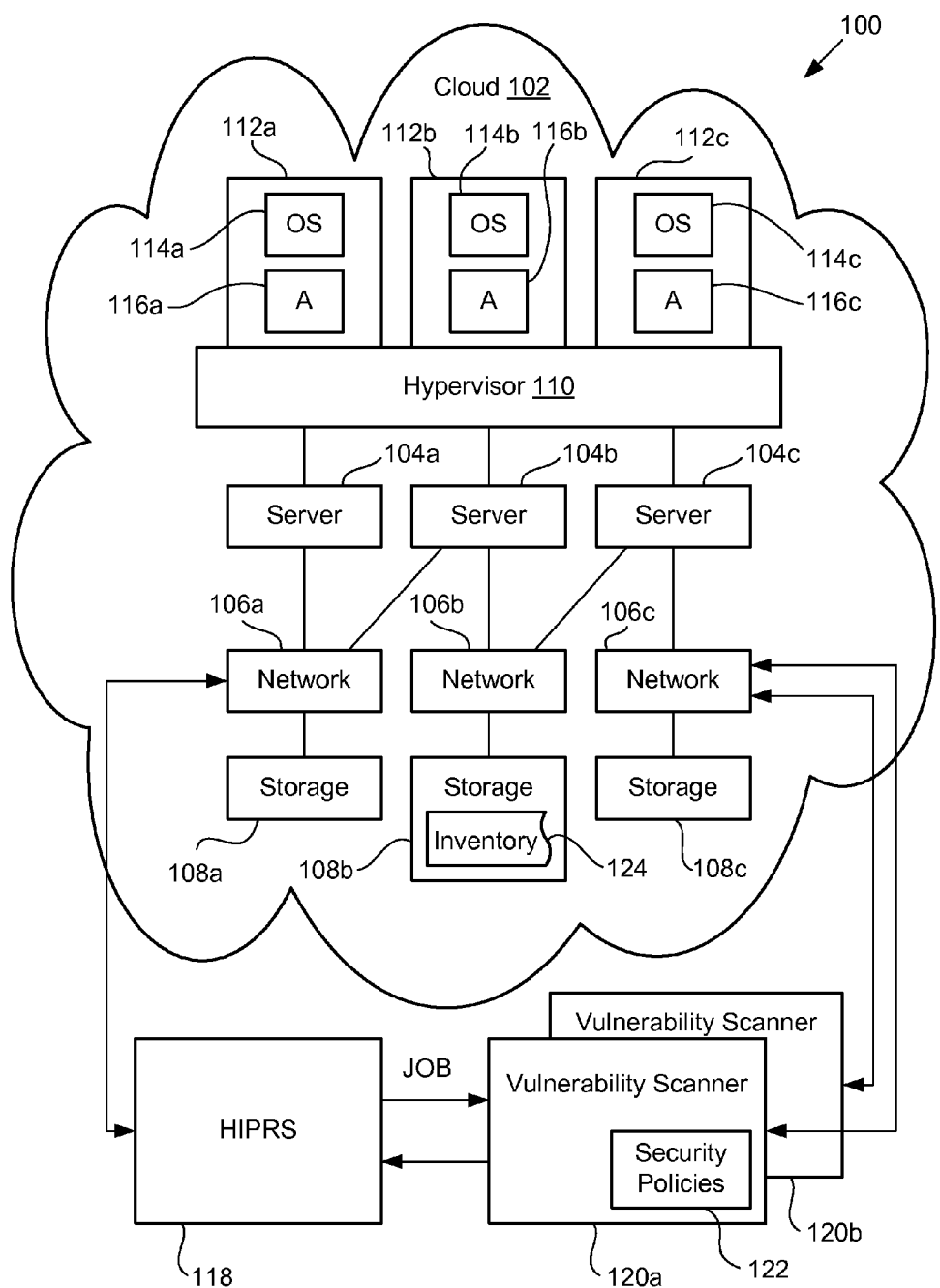
FIG. 2 illustrates a vulnerability scan architecture, in accordance with another embodiment of the present invention.

FIG. 2 illustrates an embodiment of a vulnerability scan architecture 100. The vulnerability scan architecture 100 includes a cloud 102. The cloud 102 has multiple servers 104a-104c. The servers 104a-104c are used to process a large amount of data, which is generated by various lessee entities, such as Zynga Inc. of San Francisco, Calif. It is noted that an entity may be a corporation, a partnership, or an individual. The servers 104a-104c are owned by an owner entity. Processing power of the servers 104a-104c may be leased by an owner entity to lessees, such as an entity.

Each server 104a-104c includes a central processing unit (CPU). Servers 104a, 104b, and 104c are coupled with networks 106a, 106b, and 106c. Each network 106a, 106b, and 106c may be the Internet or an Intranet.

Servers 104a-104c are coupled with each other and to a storage system via one or more networks. In one embodiment, server 104a is coupled with a storage system 108a via network 106a. Similarly, server 104b is coupled with a storage system 108b via network 106b and server 104c is coupled with a storage system 108c via network 106c. Also, server 104a is coupled with server 104b via network 106a and server 104b is coupled with server 104c via network 106b. The large amount of data is stored in one or more of storage systems 108 and accessed by one or more of servers 104 via one or more networks 106.

As used herein, a storage system is a random access memory (RAM), a read-only memory (ROM), or a combination of RAM and ROM. In one embodiment, storage system 108a includes a database that allows one or more of servers 104a-104c to access data. In some embodiments, a storage system includes one or more memory devices, such as flash memory cards, a redundant array of independent disks (RAID), and hard disks.

Although a few components are shown in cloud 102, in some embodiments, additional components, such as, a display device, an input device, a printer, speakers, an optical drive, a universal serial bus (USB) port, a graphics processing unit (GPU), a video card, are included. Examples of input device include a mouse, a keyboard, a stylus, and any other wired or wireless input device. Examples of a display device are provided above.

A VM, such as VM 112a, VM 112b, or VM 112c, is executed by one or more servers 104a-104c. In one embodiment, VM 112a is a software application executed by servers 104a and 104b. A VM includes an operating system (OS). In one embodiment, VM 112a includes an OS 114a, VM 112b includes an OS 114b, and VM 112c includes an OS 114c. It should be noted that a VM includes a virtual processor and a virtual storage system, which are not shown for convenience. A virtual processor is processing power of one or more servers 104. Also, a virtual storage system is storage capability of one or more storage systems 108.

An OS within a VM may be the same or different than an OS within another VM. In one embodiment, OS 114a may be a Linux operating system and OS 114b may be a Windows operating system. In another embodiment, OS 114b may be an OS X Lion operating system and OS 114c may be a Unix operating system.

An application within an OS runs on top of the OS. In one embodiment, application 116a runs on top of OS 114a. Moreover, an application within a VM may be the same or different than an application within another VM. For example, application 116a may be FARMVILLE game software developed by ZYNGA Inc. and application 116b may be a word processing software developed by GOGGLE corporation of Mountain View, Calif. In another embodiment, application 116b may be MICROSOFT EXCEL software developed by MICROSOFT corporation of Seattle, Wash. and application 116c may be CITYVILLE game software developed by ZYNGA Inc.

In some embodiments, an application includes a gaming service application, a music service application, a video service application, a shopping service application, an image storage service application, a search service application, a document storage service application, a document creation service application, a social network service application, or any other service application that generates data that is distributed via a massive distributed server system. In one embodiment, the server system includes multiple servers 104.

It should be noted that application 116a, 116b, or 116c is developed by an entity. In one embodiment, if application 116a, 116b, or 116c is not developed by an entity, it may be under control of the entity. In some embodiments, an application 116a, 116b, or 116c is under control of an entity if the application is licensed by the entity from a developer of the application. In one embodiment, an application 116a, 116b, or 116c is under control of an entity if the entity is authenticated with a passcode to allow the entity to control execution of the application.

A hypervisor 110 is a platform virtualization software that is executed by each server 104a, 104b, and 104c to create, manage and monitor any number of VMs. The hypervisor 110 allocates components, such as servers 104, networks 106, storage systems 108, and other components of cloud 102, to VMs 112 for a time period based on availability of the components. In one embodiment, VM 112a is executed by server 104a for a time period and by server 104b for a time period.

In another embodiment, OS 114a is stored within storage system 108a for a time period and is stored in storage system 108b for a time period.

In one embodiment, the hypervisor 110 is used to emulate virtual hardware, partition physical hardware, virtualize physical hardware, or execute VMs 112 to provide access to the components of cloud 102. Hypervisor 110 may include a hypervisor manufactured by VMW are corporation of Palo Alto, Calif.; an open source product whose development is overseen by Xen.org community; HyperV, VirtualServer or virtual PC hypervisors provided by Microsoft corporation; or others.

Each VM 112a, 112b, and 112c has an associated IP address. For example, VM 112a has an IP address $IP_A$, VM 112b has another IP address $IP_B$, and VM 112c has yet another IP address $IP_C$.

One or more servers 104 collect and store one or more IP addresses of one or more VMs 112 in an inventory 124. An inventory, as used herein, is a database. Inventory 124 includes one or more IP addresses of one or more VMs 112, which is running one or more applications developed by or controlled by a single entity. In some embodiments, the single entity may own or control operation of the vulnerability scanner node 120a or 120b.

When VM 112a, 112b, or 112c terminates, one or more servers 114 delete an IP address of the VM from inventory 124. A VM 112a, 112b, or 112c terminates when an IP address of the VM changes, the VM stops executing, or an OS within the VM changes. In some embodiments, any change to a VM after storage of an IP address of the VM in inventory 124 is considered termination of the VM.

HIPRS 118, which may be a computer or a processor, accesses the IP addresses within inventory 124 to create a job bundle. HIPRS 118 updates the job bundle before submitting the job bundle to a vulnerability scanner node 120a or 120b. In one embodiment, HIPRS 118 updates the job bundle to delete an IP address of VM 112a, 112b, or 112c that has been terminated. VM 112a, 112b, or 112c is terminated between a time of storage of an IP address of the VM in inventory 124 and a time of access of the IP addressed by HIPRS 118 from the inventory 124. The updated job bundle is provided by HIPRS 118 to vulnerability scanner node 120a or 120b.

Upon receiving the updated job bundle, vulnerability scanner node 120a or 120b applies a set of security checks 122 to determine whether VM 112a, 112b, or 112c is vulnerable to security attacks from hackers. In one embodiment, vulnerability scanner node 120a applies security checks 122 to determine whether VM 112a includes a Windows operating system and if so, determines that VM 112a may be subject to security attacks from hackers. In another embodiment, vulnerability scanner node 120a applies security checks 122 to determine whether VM 112a is executing a particular application, such as a computer virus or backdoor program, and if so, determines that VM 112a is vulnerable to security attacks from hackers.

Vulnerability scanner node 120a or 120b may be a computer or a processor connected to cloud 102. In one embodiment, vulnerability scanner node 120a or 120b is a server.

In some embodiments, vulnerability scanner node 112a generates a report, such as one indicating the various classes of vulnerability, to display on a display device to a user. The display device on which the report is displayed may be a part of vulnerability scanner node 120a or a component of cloud 102.

It should be noted that although a limited number of VMs 112, servers 104, networks 106, and storage systems 108 are shown in FIG. 1, in some embodiments, a different number of servers 104, networks 106, and storage systems 108 may be used. Moreover, it should be noted that although a specific number of hypervisor 110 and HIPRS 118 are shown in FIG. 1, in other embodiments, a different number of hypervisors and HIPRSs may be used. Also, any number of vulnerability scanners 120 may be used.

Figure 3A:
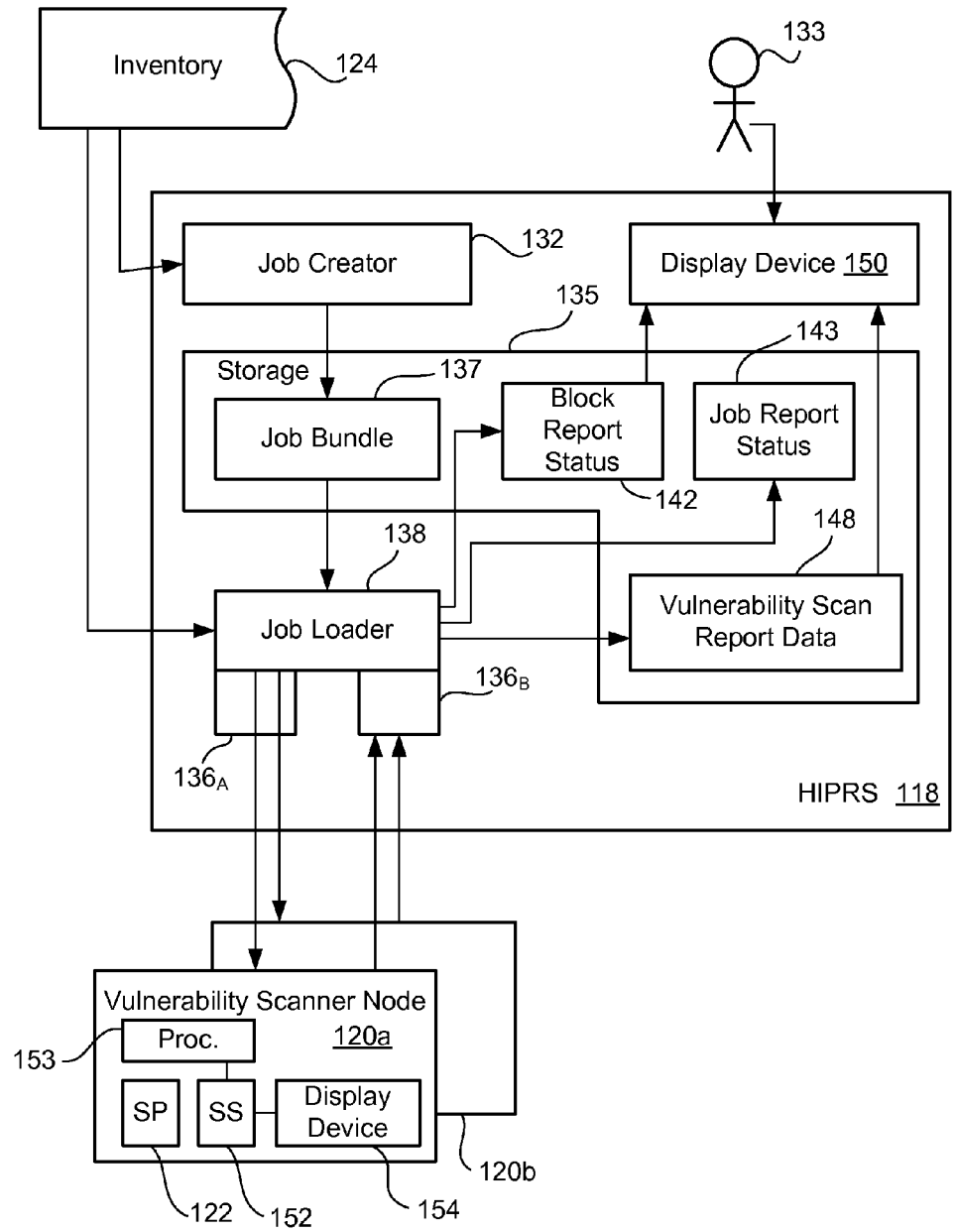
FIG. 3A is a block diagram of a host information processing system (HIPRS) that can operated in the vulnerability scan architecture of FIG. 1 and/or the vulnerability scan architecture of FIG. 2, in accordance with one embodiment of the present invention.
Figure 3B:
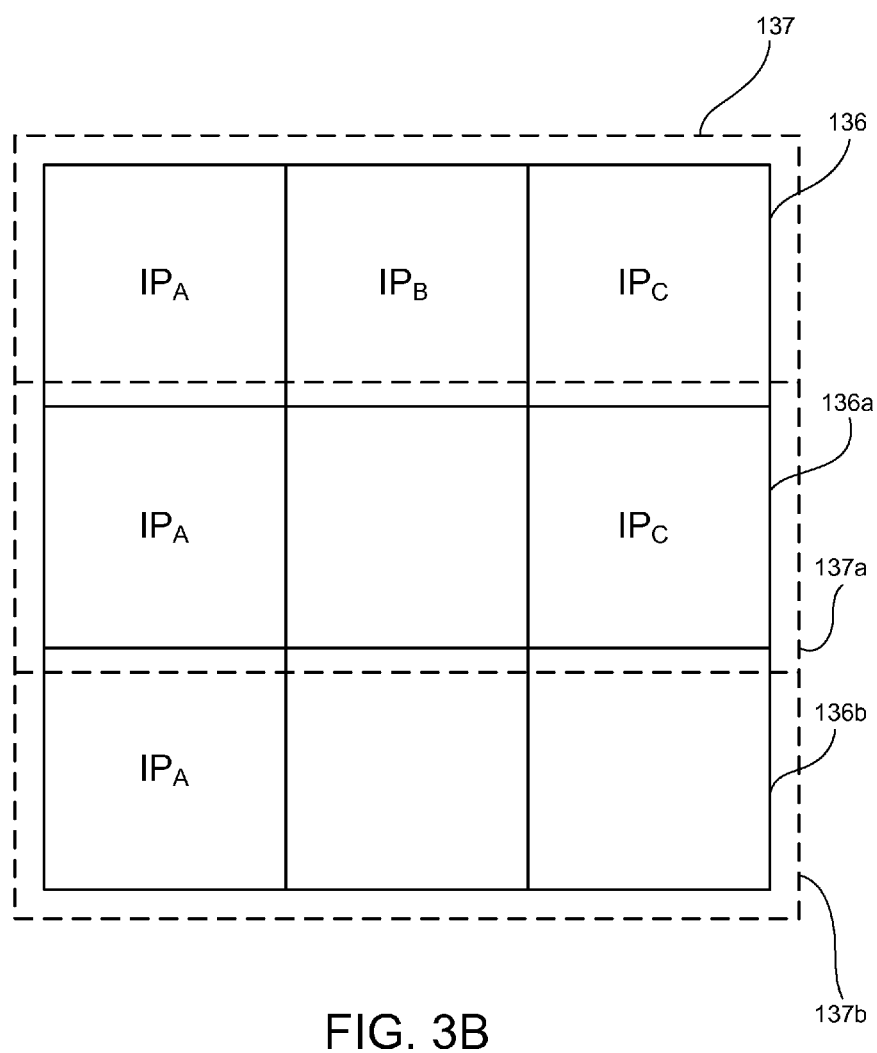
FIG. 3B illustrates purging of Internet Protocol (IP) addresses of Virtual Machines (VMs) from blocks of a job bundle, in accordance with one embodiment of the present invention.

FIG. 3A is a block diagram of an embodiment of HIPRS 118. A job creator module 132 accesses N IP addresses of N VMs 112 from inventory 124, wherein N is an integer greater than zero. In one embodiment, the user 133 accesses a graphical user interface (GUI) or enters a script on display device 150 to execute job creator module 132. In another embodiment, job creator module 132 is automatically executed without intervention from the user 133. Job creator module 132 creates X blocks from the N IP addresses, where X is an integer greater than zero. Each block includes one or more IP addresses. One of the X blocks is shown as block 136, which is stored in a storage system 135 by job creator module 132. The X blocks are part of a job bundle 137. An embodiment of block 136 and an embodiment of the job bundle 137 are shown in FIG. 3B. Block 136 has IP addresses $IP_A$, $IP_B$, and $IP_C$ of three VMs 112.

Referring back to FIG. 3A, a job loader module 138 accesses block 136 from storage system 135 and accesses updated IP addresses from inventory 124. IP addresses within inventory 124 may have been updated by one or more servers 104 to drop IP address $IP_B$. In one embodiment, the IP addresses $IP_A$, $IP_B$, and $IP_C$ are updated within inventory 124 between a time of storage of the IP addresses $IP_A$, $IP_B$, and $IP_C$ in inventory 124 and a time of access of one or more of the IP addresses $IP_A$, $IP_B$, and $IP_C$ from the inventory 124 by job loader module 138.

One or more servers 114 determines whether one of VMs 112 corresponding to IP address $IP_B$ has been terminated and purges the IP address $IP_B$ from inventory 124 upon determining that the VM has been terminated. After the purge, the job loader module 138 compares the inventory 124 with the block 136 to determine that the IP address $IP_B$ has been purged from inventory 124 and to purge the IP address $IP_B$ from block 136. The IP address $IP_B$ is purged from block 136 to generate a block $136_A$ or to update block 136 to block $136_A$.

When the block 136 is updated to block $136_A$, another job bundle $137_A$ is created and stored in storage system 135 by job loader module 138. The job bundle $137_A$ includes the block $136_A$. An embodiment of block $136_A$ and an embodiment of job bundle $137_A$ are shown in FIG. 3B. As shown, IP address $IP_B$ is deleted from block 136 to create the block $136_A$.

Referring back to FIG. 3A, job loader module 138 provides the job bundle $137_A$ including the block $136_A$ to vulnerability scanner node 120a. When block $136_A$ is submitted to vulnerability scanner node 120a, job loader module 138 may access a block report status 142 indicating a status, such as 'pending', of block $136_A$ and may access a job report status 143 indicating a status, such as 'pending', of job bundle 137. Unless all blocks within job bundle $137_A$ are scanned by vulnerability scanner 120a or 120b, job creator module 132 maintains the job report status 143 of 'pending'.

In some embodiments, job loader module 138 submits a previously un-dispatched block to vulnerability scanner node 120b. This distribution of blocks between different scanners 120a and 120b allows the job loader module 138 to distribute work load between vulnerability scanner nodes 120a and 120b.

Vulnerability scanner node 120a receives the job bundle $137_A$ including the block $136_A$ and applies the security checks 122 via a portion of cloud 102 to VMs 112a and 112c having the IP addresses $IP_A$ and $IP_C$ to determine whether the VMs 112a and 112c are vulnerable to security attacks. Vulnerability scanner node 120a generates vulnerability scan report data indicating vulnerability of VMs 112a and 112c and provides the vulnerability scan report data to job loader module 138. It should be noted that a large amount of time, which may have an order of hours, may have passed between submission of job bundle $137_A$ to vulnerability scanner 120a for vulnerability scanning and reception of the vulnerability scan report data by job loader 138.

While vulnerability scanning is in progress, job loader 138 accesses a job bundle $137_B$ to determine whether one or more of the VMs 112a and 112c having IP addresses $IP_A$ and $IP_C$ have been terminated. The job bundle $137_B$ is generated by updating the job bundle $137_A$. The update is performed by job loader module 138 to match IP addresses of job bundle $137_A$ with IP addresses of inventory 124. The IP addresses within inventory 124 may have been updated by one or more servers 104 to purge the IP address $IP_C$. In response to determining that IP address $IP_C$ is purged from inventory 124, the job loader module 138 updates the block $136_A$ to purge the IP address $IP_C$ of VM 112c from block $136_A$. The purge is performed to generate another block $136_B$, an embodiment of which is shown in FIG. 3B. The block $136_B$ excludes the IP address $IP_C$ of VM 112c. When the block $136_A$ is updated to block $136_B$, another job bundle $137_B$ is created and stored in storage system 135 by job loader module 138. The job bundle $137_B$ includes the block $136_B$. An embodiment of the job bundle $137_B$ is also shown in FIG. 3B. As shown in FIG. 3B, block $136_B$ indicates to job loader module 138 that VM 112c has been terminated.

Job loader module 138 requests to receive the vulnerability scan report data for VMs 112a and 112c identified by block $136_A$ from vulnerability scanner node 120a. Upon reception of the vulnerability scan report data for block $136_A$, job loader module 138 deletes a portion of the vulnerability scan report data corresponding to scan of the VM 112c that was terminated while a vulnerability scan of the VMs 112a and 112c was in progress. The deletion of the portion is performed to generate vulnerability scan report data 148, which is provided by job loader 138 to display device 150. In one embodiment, display device 150 receives the vulnerability scan report data 148 to render a vulnerability scan report to show to user 133.

In another embodiment, instead of requesting the vulnerability scan report for the block $136_A$ from vulnerability scanner node 120a, the job loader module 138 deletes the portion of the vulnerability scan report data from the vulnerability scanner 120a to generate the vulnerability scan report data 148. A processor 153 of the vulnerability scanner 120a stores the vulnerability scan report data 148 in a storage system 152. In one embodiment, display device 154 of the vulnerability scanner 120a receives the vulnerability scan report data 148 from the processor 153 to render a vulnerability scan report.

In some embodiments, display device 150 receives the block report status 142 to render a block report to show to user 133. In one embodiment, display device 150 accesses the job report status 143 from storage system 135 to render a job report on display device 150 to show to user 133. The job report is an aggregation of block report status 142 of all blocks within job bundle $137_B$.

Figure 4:
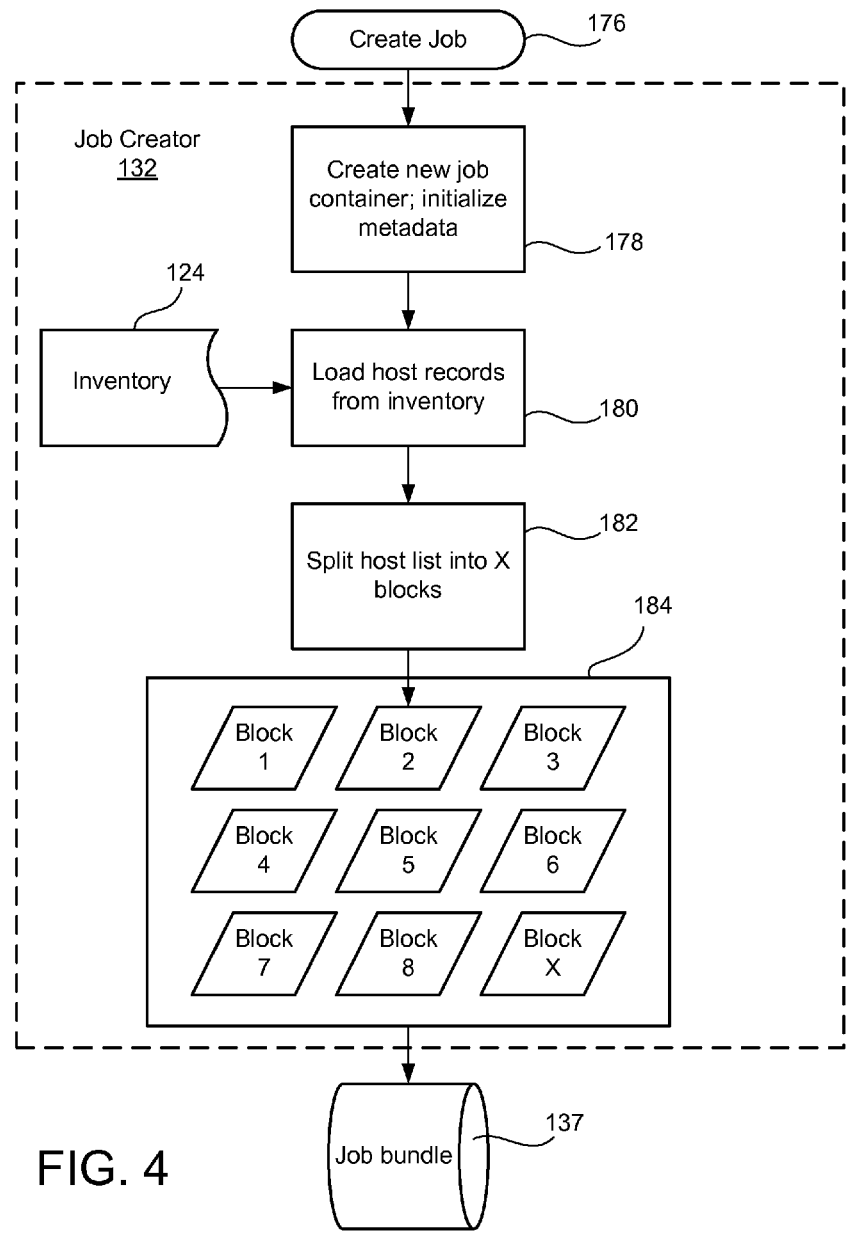
FIG. 4 is a flowchart of a method for creating one or more job bundles, in accordance with one embodiment of the present invention.

FIG. 4 is a flowchart of an embodiment of a method 176 for creating one or more job bundles, in accordance with one embodiment of the present invention. The method 176 is a part of job creator module 132. In operation 178, a job container, which is a memory space within storage system 135, is created for a job bundle. Moreover, metadata, such as the block report status 142 and the job report status 143, is initiated. In operation 180, host records, such as the IP addresses $IP_A$, $IP_B$ and $IP_C$, are accessed from inventory 124. The host records are stored in a host list. In operation 182, the host list is split into the X blocks to create the job bundle 137 and all the X blocks are marked 'pending'.

Figure 5:
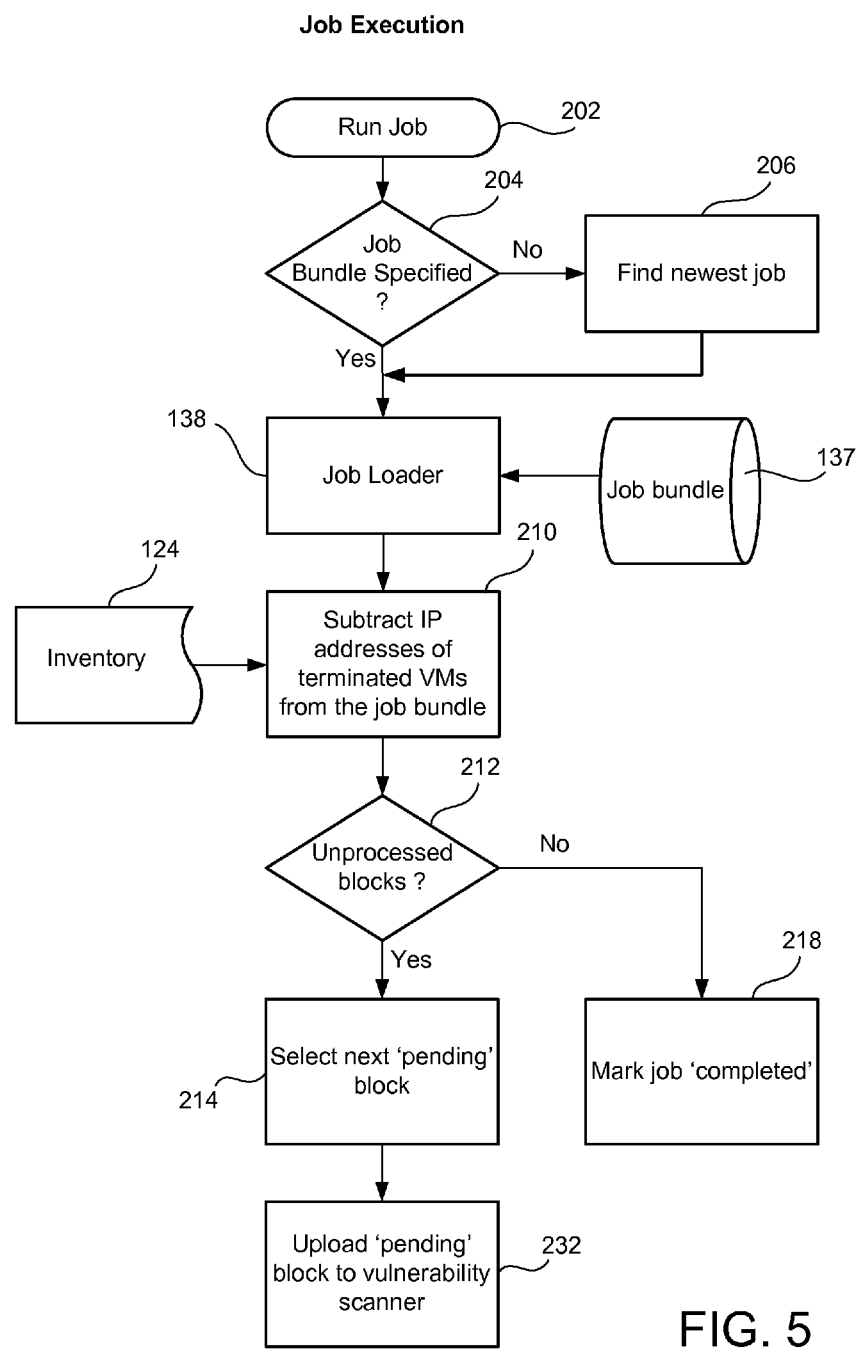
FIG. 5 is a flowchart of an embodiment of a method for executing a job, in accordance with one embodiment of the present invention.

FIG. 5 is a flowchart of an embodiment of a method 202 for running a job. The method 202 is a part of job loader module 138. In operation 204, job loader module 138 determines whether job bundle 137 is specified. Job bundle 137 is specified if the job bundle 137 is stored in storage system 135. In response to determining that the job bundle 137 is not specified, the job loader module 138 searches, in operation 206, for a job bundle in storage system 135 for which a job is to be executed. In response to determining that the job bundle 137 is specified or to determining that a job bundle exists in storage system 135 for which a job is to be executed, job loader module 138 accesses inventory 124 to determine whether any VMs 112 have been terminated since the job bundle 137 was stored in storage system 135.

In operation 210, in response to determining that one or more of VMs 112 have been terminated, IP addresses of the VMs are subtracted from job bundle 137. In operation 212, it is determined whether any unprocessed blocks within the job bundle 137 remain. For example, job loader module 138 determines whether all blocks within job bundle 137 have been scanned for vulnerability scan. If all blocks have been scanned, the job bundle 137 is marked 'complete' in block report status 142 in operation 218. On the other hand, in response to determining that a 'pending' block remains in job bundle 137 to be scanned, in operation 214, the 'pending' block is selected. In operation 232, the 'pending' block is uploaded to vulnerability scanner node 120a or 120b for vulnerability scanning.

Figure 6:
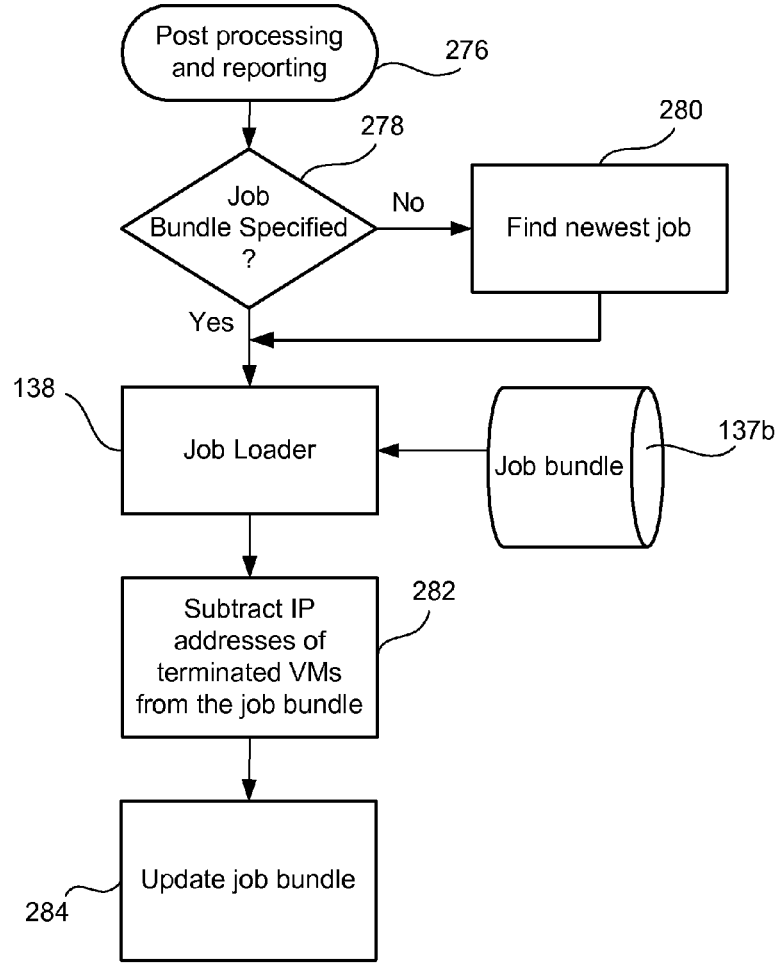
FIG. 6 is a flowchart of an embodiment of a method for post processing a job bundle after scanning the job bundle and for reporting of vulnerability scan data related to the post-processed job bundle, in accordance with one embodiment of the present invention.

FIG. 6 is a flowchart of an embodiment of a method 276 for post processing of job bundle $137_A$ after completion of scan of the job bundle $137_A$ and reporting of vulnerability scan data related to the post processed job bundle. The method 276 is executed by job loader module 138. In operation 278, it is determined whether the job bundle $137_A$ is specified. The job bundle $137_A$ is specified if the job bundle $137_A$ is stored in storage system 135. In response to determining that the job bundle $137_A$ is not specified, the job loader module 138 searches, in operation 280, for a job bundle, whose scan has been performed, in storage system 135. In response to determining that the job bundle $137_A$ is specified or to determining that a job bundle exists in storage system 135 for which a job is to be executed, job loader module 138 accesses the job bundle $137_A$ to determine whether any VMs 112 have been terminated since the job bundle $137_A$ was stored in storage system 135.

In operation 282, in response to determining that one or more of VMs 112 have died, IP addresses of the VMs are subtracted from job bundle $137_A$ to create the job bundle $137_B$. The job bundle $137_A$ is updated, in operation 284, to create the job bundle $137_B$.

It is noted that various embodiments are described using information, such as IP addresses, of VMs 112. In other embodiments, these various embodiments can be described using other information, such as VM nicknames instead or a combination of the nicknames and IP addresses. In one embodiment, VM nicknames include nicknames of applications 116. For example, a VM nickname is 'FarmVille'. Another VM nickname may be 'Mafia'.

Figure 7:
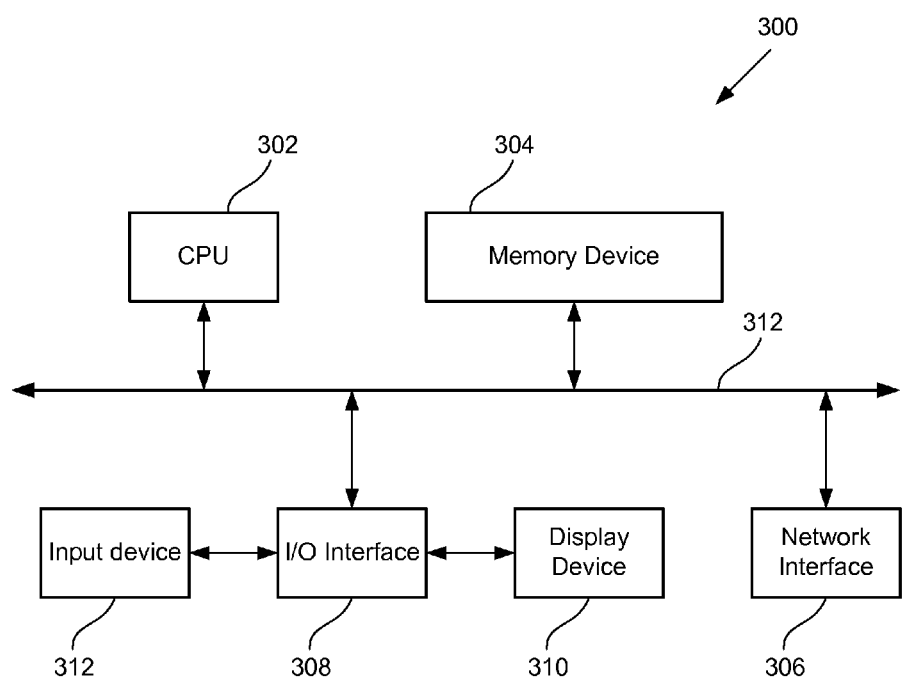
FIG. 7 is a block diagram of a computer, in accordance with one embodiment of the present invention.

FIG. 7 is a block diagram of an embodiment of a computer 300. Computer 300 includes a CPU 302 and a memory device 304. Computer 300 further includes a network interface 306, an I/O interface 308, a display device 310, and an input device 312. Input device 312 may be a keyboard, a mouse, or a stylus. The memory device 304 may include an operating system and one or more applications.

The CPU 302 is a logic circuit that responds to and processes instructions fetched from memory device 304. In many embodiments, CPU 302 is provided by a microprocessor unit, such as: that manufactured by Intel Corporation of Mountain View, Calif.; that manufactured by Motorola Corporation of Schaumburg, Ill.; that manufactured by Transmeta Corporation of Santa Clara, Calif.; that manufactured by International Business Machines of White Plains, N.Y.; or that manufactured by Advanced Micro Devices of Sunnyvale, Calif. Computer 300 may be based on any of these processors, or any other processor capable of operating as described herein.

In one embodiment, network interface 306 is a network interface card (NIC) that enables CPU 302 to communicate with a network, such as the Internet.

In one embodiment, memory device 304 is one or more memory chips capable of storing data and allowing any storage location to be directly accessed by the CPU 302. In some embodiments, memory device 304 is a Static random access memory (SRAM), Dynamic random access memory (DRAM), or Ferroelectric RAM (FRAM). The memory device 304 may be based on any of the above described memory chips, or any other available memory chips capable of operating as described herein. The CPU 302 communicates with memory device 304, I/O interface 308, and network interface 306 via a system bus 312.

It should be noted that in one embodiment, one or more modules 132 and 138 may be stored in memory device 304 and executed by CPU 302.

Embodiments of the present invention may be practiced with various computer system configurations including handheld devices, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

With the above embodiments in mind, it should be understood that the embodiments can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for a specific purpose. The apparatus is selectively activated or configured by a computer program stored in the computer.

In one embodiment, a module, as used herein, is embodied as computer readable code on a computer readable medium. The computer readable medium is any data storage device that can store data, which can be thereafter be read by a computer. Examples of the computer readable medium include hard drives, network attached storage (NAS), read-only memory (ROM), random-access memory, compact disc-ROMs (CD-ROMs), CD-recordables (CD-Rs), CD-rewritables (RWs), magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for managing jobs to be scanned based on existence of processing nodes that are part of a cloud network, comprising:
   obtaining identification information regarding operation of a first set of processing nodes from an inventory of the processing nodes in the cloud network, each of the processing nodes of the first set having a non-terminated state;
   creating a job for scanning the processing nodes of the first set for security vulnerability, the job having the identification information;
   verifying the inventory to determine first identifying information of one of the processing nodes of the first set of processing nodes for removal from the job, wherein upon verifying, the first identifying information regarding one of the processing nodes of the first set of processing nodes is removed from the job if the one of the processing nodes of the first set of processing nodes is in a terminated state; and
   loading the job having second identifying information for a second set of processing nodes that remain after the verifying.

2. The method of claim 1, wherein the processing nodes of the first set include processing nodes that exist before the verifying, the processing nodes of the second set include processing nodes that exist after the verifying.

3. The method of claim 1, further comprising receiving scanning results regarding the loaded job, the scanning results being processed to remove results associated with a third set of processing nodes that were terminated during the scanning.

4. The method of claim 3, wherein receiving scanning results regarding the loaded job comprises receiving results regarding whether the processing nodes of the second set are vulnerable to security attacks.

5. The method of claim 3, further comprising removing third identifying information regarding one of the processing nodes of the third set that was terminated during the scanning.

6. The method of claim 1, wherein obtaining identification information comprises obtaining information regarding whether one or more of the processing nodes of the first set are terminated from a cloud.

7. The method of claim 1, wherein obtaining identification information includes obtaining nicknames of the processing nodes of the first set, or Internet Protocol (IP) addresses of the processing nodes of the first set, or a combination thereof.

8. The method of claim 1, wherein the job includes blocks that include the identification information, the identification information including information identifying the processing nodes of the first set.

9. The method of claim 1, wherein the processing nodes of the first and second sets include a plurality of virtual machines.

10. The method of claim 1, further comprising scanning the processing nodes of the second set for security vulnerability to determine whether the processing nodes of the second set are vulnerable to security attacks from hackers.

11. The method of claim 1, wherein verifying the inventory comprises checking a database to determine the first identifying information of the one of the processing nodes that is terminated from the cloud network.

12. The method of claim 1, wherein loading the job comprises providing the job to a vulnerability scanner to determine whether the processing nodes of the second set are vulnerable to security attacks.

13. A system for managing jobs to be scanned based on existence of processing nodes that are part of a cloud network, comprising:
   a memory device configured to store a job creator module and a job loader module; and
   a processor configured to execute the job creator module to:
      obtain identification information regarding operation of a first set of processing nodes from an inventory of the processing nodes in the cloud network, each of the processing nodes of the first set having a non-terminated state;
      create a job for scanning the processing nodes of the first set for security vulnerability, the job having the identification information, wherein the processor is configured to execute the job loader module to:
      verify the inventory to determine first identifying information of one of the processing nodes of the first set for removal from the job, wherein upon performing the verification, the processor is configured to remove the first identifying information regarding one of the processing nodes of the first set of processing nodes from the job if the one of the processing nodes of the first set of processing nodes is in a terminated state; and
      load the job having second identifying information for a second set of processing nodes that remain after the verification.

14. The system of claim 13, wherein the processing nodes of the first set include processing nodes that exist before the verification, the processing nodes of the second set include processing nodes that exist after the verification.

15. The system of claim 13, wherein the processor is configured to execute the job loader module to receive scanning results from the loaded job, the scanning results being processed to remove results associated with a third set of processing nodes that were terminated during the scan.

16. The system of claim 13, wherein the processing nodes of the first and second sets include a plurality of virtual machines.

17. The system of claim 13, wherein the scanning results include results regarding whether the processing nodes of the second set are vulnerable to security attacks.

18. A method for managing jobs to be scanned based on existence of processing nodes that are part of a network, comprising:
   obtaining identification information regarding operation of the processing nodes, each of the processing nodes of the first set having a non-terminated state;
   creating a job having the identification information;
   determining identifying information of at least one of the processing nodes for removal from the job;
   removing the determined identifying information of the at least one of the processing nodes when the at least one of the processing nodes is terminated in the network, the identification information being updated after the removing; and loading the job having the updated identification information for processing nodes that remain after the removing, the loading performed for scanning the remaining processing nodes for vulnerability to security attacks.

19. The method of claim 18, wherein obtaining identification information includes obtaining nicknames of the processing nodes, Internet Protocol (IP) addresses of the processing nodes, or a combination thereof.

20. The method of claim 18, wherein the network includes a cloud network, wherein determining identifying information of at least one of the processing nodes for removal from the job comprises determining an identity of the at least one of the processing nodes that is terminated from the cloud network.

* * * * *